US008375128B2

(12) United States Patent
Tofighbakhsh et al.

(10) Patent No.: US 8,375,128 B2
(45) Date of Patent: Feb. 12, 2013

(54) METHODS AND APPARATUSES FOR PROVIDING COMMUNICATIONS SERVICES IN CONNECTION WITH A COMMUNICATIONS NETWORK

(75) Inventors: Mostafa Tofighbakhsh, Cupertino, CA (US); Yuang Lou, Dunwoody, GA (US); Jacob Lahav, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 381 days.

(21) Appl. No.: 12/343,198

(22) Filed: Dec. 23, 2008

(65) Prior Publication Data

US 2010/0161802 A1    Jun. 24, 2010

(51) Int. Cl.
*G06F 15/173* (2006.01)
(52) U.S. Cl. .................. 709/226; 709/220; 455/406
(58) Field of Classification Search .................. 709/226, 709/220; 455/406, 414.1
See application file for complete search history.

(56) References Cited

U.S. PATENT DOCUMENTS

| 7,944,880 B2* | 5/2011 | Skog et al. ..................... 370/329 |
| 2003/0174688 A1* | 9/2003 | Ahmed et al. ................. 370/349 |
| 2007/0121501 A1* | 5/2007 | Bryson ........................... 370/230 |
| 2008/0130656 A1* | 6/2008 | Kim et al. ................. 370/395.21 |
| 2008/0271113 A1* | 10/2008 | Belling ............................... 726/1 |
| 2008/0293413 A1* | 11/2008 | Sharif-Ahmadi et al. . 455/435.1 |
| 2010/0048161 A1* | 2/2010 | He et al. ..................... 455/404.1 |
| 2010/0220604 A1* | 9/2010 | Skog et al. ..................... 370/252 |

OTHER PUBLICATIONS

Motorola, Inc. Long Term Evolution, A Technical Overview 2007.*
Integration of Wireless LAN and 2G Wireless Policy-Based QoS Management Architecture in an Integrated UMTS and WLAN Environment Wei Zhuang, Yung-Sze Gan, Kok-Jeng Loh, and Kee-Chaing Chua, Siemens Singapore, Nov. 2003.*

* cited by examiner

*Primary Examiner* — Patrice Winder
*Assistant Examiner* — Tauqir Hussain
(74) *Attorney, Agent, or Firm* — Parks IP Law LLC; Jennifer P. Medlin, Esq.

(57) ABSTRACT

Systems and methods for providing differentiated user service options on communications networks are disclosed. Devices can be configured to generate service change requests, and to transmit the service change requests to a network node. The service change request can be routed to a node that determines if the service change request should be granted. The device and network can begin operation in accordance with the service change request almost instantly since no negotiation is required between the device and the network. Methods and computer-readable media embodying methods for providing differentiated user service options, are also disclosed.

21 Claims, 5 Drawing Sheets

METHODS AND APPARATUSES FOR PROVIDING COMMUNICATIONS SERVICES IN CONNECTION WITH A COMMUNICATIONS NETWORK

TECHNICAL FIELD

The present disclosure relates generally to communications networks and, more particularly, to methods and apparatuses for providing differentiated user service options on communications networks.

BACKGROUND

The complexity and prevalence of communications networks has been increasing rapidly. As the number of data-based applications has skyrocketed, data transfer has expanded from simple computer-to-computer transfers to web browsing, video delivery, broadband data access, gaming, television, weather services, and the like. With an increasing number of applications depending upon data transfer, the ability to predict IP traffic has become increasingly more difficult. Accurate prediction of IP traffic flow and data management is helpful for maintaining and delivering quality services to customers. However, there are few, if any, accurate predictive models for network traffic.

In lieu of accurate modeling, several quality management approaches are sometimes used to address the issue of unpredictable network demand. One quality management approach includes time division multiplexing (TDM). In TDM, two or more signals are transferred as sub-channels in one communication channel, by taking sequential turns transmitting signals on one channel. The time domain is divided into several timeslots of fixed length, one for each sub-channel. Prior to initiating a TDM data session, a session service quality is evaluated and granted through the network administration. A TDM data session is established by a regular time-slot allocation through a negotiation process with the network. In general, the network reserves some time slots to keep these time slots open and available. As such, quality of service (QoS) for individual users may be maintained, but may result in network inflexibility and unused idle capacity. As such, many TDM systems result in some data sessions being delayed in the service queuing line waiting for access permission while some of the reserved TDM time slots remain idle.

Compared to TDM data access, best-effort transmission (BET) reflects a flexible data management at another policy extreme. With BET, all data sessions can access the network instantly. At times, the parties attempting to access the network will be successful, while sometimes the parties will be held and delayed. Some data sessions are not sensitive to delay, for example, email or file transfers. In such cases, interruptive delays can be tolerated and the file and/or email transfers can resume when the network resources are available. Some other applications are not as tolerant of interruptive delays. For example, in cases of real-time delivery of IP data, video, and the like, performance will be adversely affected by transmission delays. BET cannot guarantee a QoS delivery. These interruptive delays will show up on service records and/or can interrupt and/or stop various services.

SUMMARY

According to exemplary embodiments of the present disclosure, a user is provided with the ability to obtain differentiated service options on a communications network. In some embodiments, service options such as, for example, QoS authorization and QoS policy decisioning and enforcement, are no longer under exclusive control of the network. With respect to QoS changes, QoS change requests can be received interactively from a device, which allows devices to dynamically request QoS changes based upon device features, applications, current usages, and the like, without interaction or interruption from network elements. In some embodiments, allowing devices to request service changes can allow network operators to move, from a network to devices, much of the logic and intelligence needed to monitor network traffic, to recognize service needs, and to request service changes. As such, network elements can accommodate users by tailoring delivery to traffic needs that can be random, difficult to monitor, and changes in which can be unpredictable. By allowing devices to control such service changes, networks can accommodate users' needs without increasing network burden and network resources. Accommodating users' needs can help network operators gain users' satisfaction and business.

The systems and methods disclosed and described herein can be used for providing differentiated user service options on communications networks. The systems and methods can allow devices to secure substantially instant session-based service change requests in accordance with expectations for user-initiated service options. The disclosed systems and methods provide support for flexible and dynamic user traffic management, for example, through session-based QoS level change requests. A user can initiate a QoS request on behalf of a particular data session at a device. Users' expectations can be met by instantly and dynamically accommodating requests for network resources according to device needs.

One embodiment of the present disclosure includes a system for providing differentiated service options to a device operating on a communications network at a first service level. The system can include a system memory for storing a policy associated with a user of the device; a policy and charging rules function for retrieving the policy to determine a service rule corresponding to a network resource to be allocated to a user; a policy and charging enforcement function for generating enforcement rules corresponding to the service rule; and an instant policy and charging rules function (IPCRF). The IPCRF can include an IPCRF processor and an IPCRF memory for storing instructions. The instructions can be executable by the IPCRF processor to make the IPCRF operable to recognize received data as an instant service change request; determine if the user is entitled to request instant service changes; grant the instant service change request, if the user is entitled to request instant service changes; and pass an instruction to one or more network nodes instructing the network nodes to allow the device to operate at a second service level, the second service level corresponding to a service level requested in the instant service change request. In some embodiments, the system memory includes a subscriber profile repository (SPR).

In some embodiments, the instructions further include instructions, executable by the IPCRF processor to make the IPCRF operable to determine if the user is entitled to request instant service changes by retrieving and analyzing a service function account (SFA) setting associated with the user to determine if a user is entitled to request instant service changes. The SFA can be a database, a server, and/or a data stored at the SPR as a subscriber profile setting.

In some embodiments, the instructions further include instructions, executable by the IPCRF processor to make the IPCRF operable to determine if the user is entitled to request instant service changes by retrieving and analyzing data that indicates if network resources are available for allowing the device to operate at the second service level. The instructions for retrieving and analyzing data that indicates if network resources are available can include retrieving and analyzing data generated by a network monitoring device to determine if network resources are available for allowing the device to operate at the second service level.

In some embodiments, the instructions include instructions, executable by the IPCRF processor to make the IPCRF operable to retrieve and analyze data indicating the status of the resource provided to the device to allow the device to operate at the second service level; and determine if the device is using the resource provided to the device. The IPCRF can pass an instruction to one or more network nodes instructing the network nodes to allow the device to operate at the first service level, if the IPCRF determines that the resource provided to the device is not being utilized by the device. The IPCRF can determine that the resource provided to the device is not being utilized by determining that the resource is not being utilized at a designated level over a designated time period.

In some embodiments, the IPCRF further includes instructions, executable by the IPCRF processor to make the IPCRF operable to retrieve and analyze data indicating the status of the communications network; and determine if the communications network needs the resources provided to the device to allow the device to operate at the second service, if the IPCRF determines that the communications network needs the resources provided to the device. The IPCRF can pass an instruction to one or more network nodes instructing the network nodes to allow the device to operate at the first service level, if the IPCRF determines that the network needs the resources provided to the device. The IPCRF can determine that the communications network needs the resources provided to the device by determining that an emergency communication needs the network resource.

In some embodiments, the IPCRF further including instructions, executable by the IPCRF processor to make the IPCRF operable to generate a charging record indicating the instant service change request and that the communications network provided resources to allow the device to operate at the second service level; and transmit the charging record to a charging module of the communications network.

According to another embodiment of the present disclosure, a device for operation on a communications network includes a memory in communication with a processor and a network interface. The memory can be configured to store instructions, executable by the processor to cause the device to recognize that the device needs to operate at a second service level instead of a first service level at which the device is currently operating; generate an instant service change request that requests that the communications network allow the device to operate at the second service level; transmit to a network node, via the network interface, the instant service change request; begin communications in accordance with the second service level; and determine if the communications network is operating in accordance with the requested second service level. The device can continue transmission at the second service level, if the device determines that the communications network is operating in accordance with the second service level. Additionally, or alternatively, the device can begin transmission at the first service level, if the device determines that the communications network is not operating in accordance with the second service level.

In some embodiments, the instructions for determining further include instructions, executable by the processor to cause the device to recognize received data as an indication from a node of the communications network that the device may not operate at the second service level. In some embodiments, the instructions for determining further include instructions, executable by the processor to cause the device to determine if the device is operating at the second service level. In some embodiments, the instructions for determining further include instructions, executable by the processor to cause the device to determine if delivery of a data packet is delayed. In some embodiments, the instructions further include instructions for retransmitting the instant service change request if the device determines that the device is not operating at the second service level.

According to another embodiment of the present disclosure, a method for providing a device with differentiated user service options includes recognizing data received at an IPCRF as an instant service change request sent by a device operating at a first service level on a communications network; determining, at the IPCRF, if the device is entitled to request instant service changes; granting the instant service change request, if the IPCRF determines that the user is entitled to request instant service changes; and passing an instruction to one or more network nodes instructing the network nodes to allow the device to operate at a second service level. The second service level can correspond to a service level requested in the instant service change request.

In some embodiments, the determining further includes obtaining, at the IPCRF, a first data stored at a subscriber profile repository. The first data can indicate, to the IPCRF, the service level at which the device is entitled to operate. The method can also include obtaining, at the IPCRF, a second data stored at a service function account (SFA). The second data can indicate, to the IPCRF, if the device is entitled to request instant service changes. The method can also include obtaining, at the IPCRF, network data that indicates if the communications network can allow the device to operate at the second service level.

In some embodiments, the method includes determining at the IPCRF, after passing an instruction to one or more network nodes instructing the network nodes to allow the device to operate at a second service level, if the communications network should continue to allow the device to operate at the second service level. The IPCRF can determine that the communications network should continue to allow the device to operate at the second service level by retrieving and analyzing, at the IPCRF, data indicating the status of a resource provided to the device to allow the device to operate at the second service level to determine if the device is using the resource provided to the device.

In some embodiments, the method can also include passing an instruction to one or more network nodes instructing the network nodes to allow the device to operate at the first service level, if the IPCRF determines that the resource provided to the device is not being utilized by the device. The IPCRF can determine that the resource provided to the device is not being utilized by determining that the resource is not being utilized at a designated level over a designated time period.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
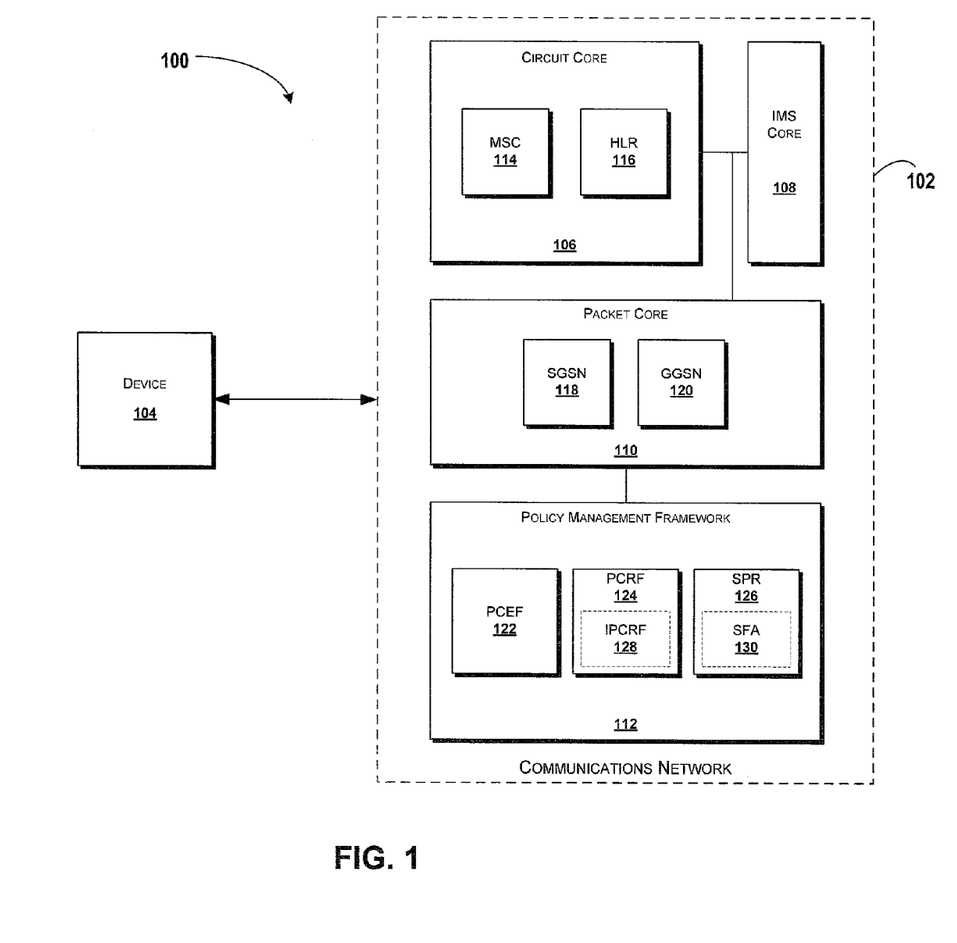
FIG. 1 schematically illustrates an exemplary wireless telecommunications network in which exemplary embodiments of the present disclosure can be implemented.

Referring now to the drawings in which like numerals represent like elements throughout the several views, FIG. 1 schematically illustrates a system 100 for providing differentiated services on communications networks, according to an exemplary embodiment of the present disclosure. The system 100 can include a communications network 102. The communications network 102 can include one or more networks including, but not limited to, one or more cellular networks, one or more packet data networks, for example, the Internet (Internet), one or more circuit switched network, for example, one or more publicly switched telephone networks (PSTN's), and/or other networks and devices. For purposes of illustration, and not limitation, the illustrated network 102 will be described as a cellular network, though some embodiments of the present disclosure include the use of other networks including, but not limited to, the Internet, a PSTN, or another network.

The communications network 102 can be configured as a 2G GSM (Global System for Mobile communications) network, and can provide data communications via GPRS (General Packet Radio Service) and EDGE (Enhanced Data rates for GSM Evolution). Additionally, the communications network 102 can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). The communications network 102 is also compatible with future mobile communications standards including, but not limited to, pre-4G and 4G, for example.

A device 104 can be in communication with the communications network 102. The communications network 102 can include a circuit core 106, an Internet protocol multimedia subsystem core 108 (IMS core), a packet core 110, and a policy management framework 112 (PMF). The communications network 102 can include mobile switching centers 114 (MSC's) and home location registers 116 (HLR's). Additionally, the communications network 102 can include components such as, but not limited to, base transceiver stations (BTS's), Node-B's, base station controllers (BSC's), radio network controllers (RNC's), short message service centers (SMSC's), multimedia messaging service centers (MMSC's), visitor location registers (VLR's), charging platforms, billing platforms, voicemail platforms, gateways, location service nodes, and the like. Although not illustrated or described herein in detail, it should be appreciated that the IMS core 108 can include various nodes, software modules, hardware modules, and/or other applications and devices.

The packet core 110 can include various nodes including, but not limited to, a gateway GPRS support node 120 (GGSN) and a Serving GPRS Support Node 118 (SGSN). The GGSN 120 can act as a gateway between the wireless data network and other networks such as the Internet or one or more other public or private networks. The GGSN 120 can also act as a PDP context and QoS enforcement point. The packet core 110 includes alternative and/or additional nodes.

More particularly, the GGSN 120 can act as an interface between the GPRS backbone network and external packet data networks such as, for example, radio networks and IP networks. The GGSN 120 can convert the GPRS packets coming from the SGSN 118 into the appropriate packet data protocol (PDP) format and can send the packets out on a corresponding packet data network. Similarly, the GGSN 120 can act as an interface in the other direction. The PDP addresses of incoming data packets are converted to the GSM address of the destination user. The readdressed packets can be sent to the responsible SGSN 118. For this purpose, the GGSN 120 can store the current SGSN address of the user and his or her profile in its location register. The GGSN 120 can be responsible for IP address assignment and can be the default router for a connected device, e.g., the device 104. The GGSN 120 also can perform authentication and charging functions.

The SGSN 118 can be responsible for the delivery of data packets from and to the mobile stations within its geographical service area. Tasks assigned to the SGSN 118 can include packet routing and transfer, mobility management, logical link management, and authentication and charging functions. The location register of the SGSN 118 can store location information, e.g., current cell, current VLR, and/or user profiles, e.g., IMSI, address used in the packet data network, of all users registered with this SGSN 118.

The packet core 110 can be in communication with the PMF 112. The PMF 112 can include various nodes including, but not limited to, a policy and charging rules function 124 (PCRF), a policy and charging enforcement function 122 (PCEF), and a subscriber profile repository 126 (SPR).

The PCRF 124 can collate subscriber and application data, authorize QoS resources, and instruct other network nodes how to handle network traffic. The PCRF 124 can be connected to various network nodes, including, but not limited to, application functions (not illustrated), as well as other elements that can require dynamic policy and QoS control over the traffic behavior. In communication with the PCRF 124, is the Policy and Charging Enforcement Function (PCEF) 122. The role of the PCEF 122 can include detecting applicable traffic and enforcing policy with respect to that traffic. The PCEF 122 can be communicate with, or can be located at, a Gateway node, e.g., the GGSN 120. A Subscriber Policy Repository 126 (SPR) can store subscriber specific data, and supply the subscriber specific data to the PCRF 124, to assist in evaluating policy decisions.

The PCRF 124 can include a hardware and/or software module referred to herein as the instant policy and charging rules function 128 (IPCRF). The IPCRF 128 can be configured to react to policy decisions generated by the device 104, as will be explained in more detail below. The SPR 126 can include storage of an on-line network service feature account 130 (SFA). The SFA 130 can indicate whether an associated user has authority to request service changes. The request of service changes and network handling of the service change requests will be described in more detail below with reference to FIGS. 4 and 5. It should be appreciated that the SFA 130 can be a device for storage of account information indicating if the user is entitled to request service changes. Alternatively, the SFA 130 can be a record stored at the SPR 126, and the record can indicate if the user is entitled to request service changes.

Figure 2:
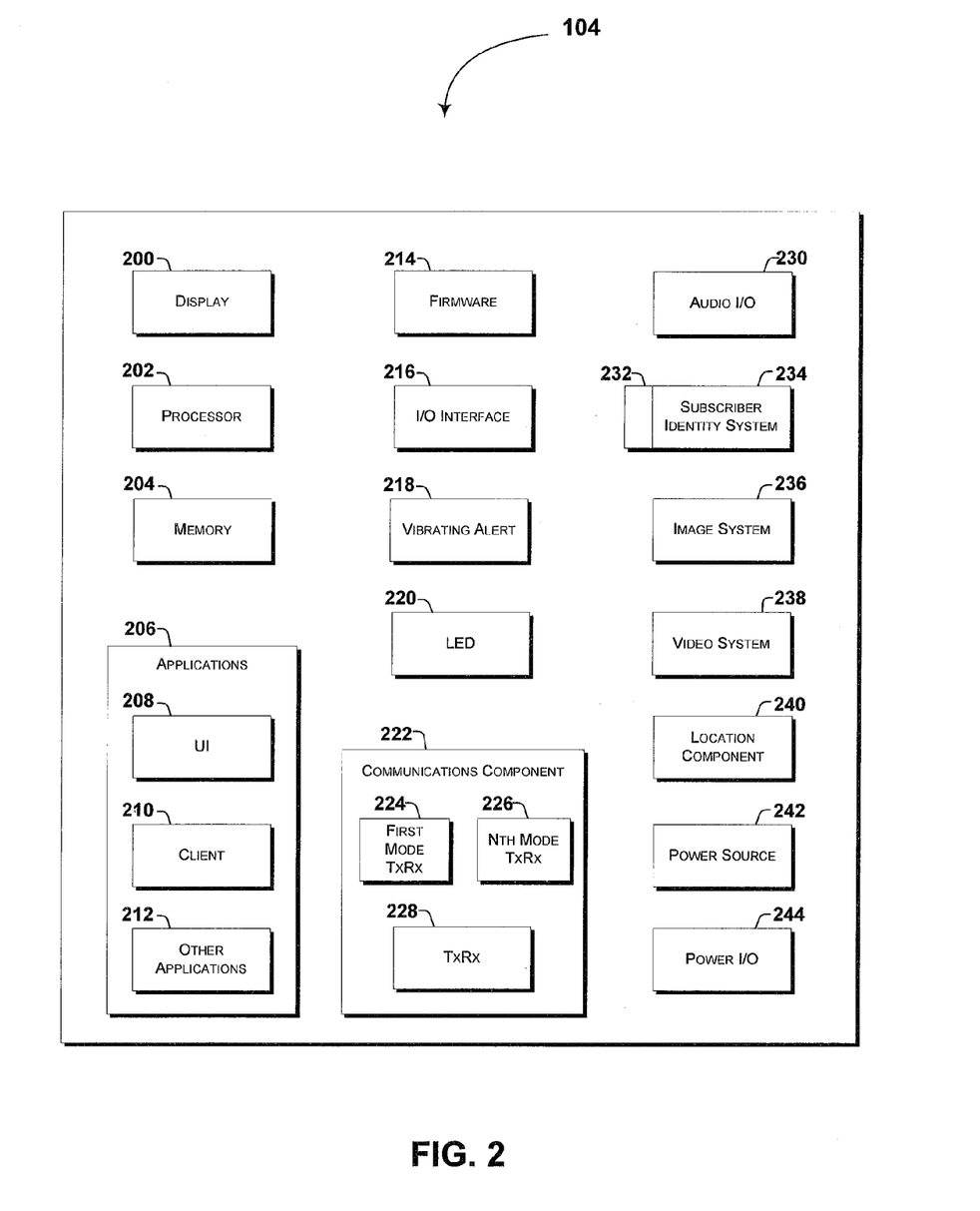
FIG. 2 schematically illustrates an exemplary device with which embodiments of the present disclosure can be implemented, according to an exemplary embodiment of the present disclosure.

FIG. 2 illustrates a schematic block diagram of an exemplary device 104 for use in accordance with some exemplary embodiments of the present disclosure. Although no connections are shown between the components illustrated in FIG. 2, the components can interact with each other to carry out functions of the device 104.

It should be understood that FIG. 2 and the following description are intended to provide a brief, general description of a suitable environment in which the various aspects of some embodiments of the present disclosure can be implemented. While the description includes a general context of computer-executable instructions, the present disclosure also can be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like.

The device 104 can be a multimode headset, and can include a variety of computer readable media, including volatile media, non-volatile media, removable media, and non-removable media. The term "computer-readable media" and variants thereof, as used in the description and claims, can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 104.

The device 104 can include a display 200 for displaying multimedia such as, for example, text, images, video, telephony functions such as Caller ID data, setup functions, menus, music, metadata, messages, wallpaper, graphics, Internet content, advertisements, device status, preferences settings, map data, navigation data, location data, and the like. The device 104 can include a processor 202 for controlling, executing, and/or processing data. A memory 204 can interface with the processor 202, and can store data. The data stored by the memory 204 can include, for example, applications 206.

The applications 206 can include, for example, service differentiation applications, navigation applications, web browsing software, text input software, mapping software, audio player software, video playback software, voicemail software, audio playback software, music player software, email software, messaging software, combinations thereof, and the like.

As will be explained in more detail below, the applications 206 can also include device monitoring applications and service change applications. The device monitoring applications can monitor device functions and traffic flow to and from the device 104 to determine if the device 104 needs access to additional services and/or resources. The service change applications can generate and transmit service change requests to the communications network 102. The service change applications can use information provided by the device monitoring applications and/or other data to determine when to trigger a service change request and/or how to format the service change requests. The service change applications can also prompt the device 104 when to begin using the requested service and/or service level by indicating when the request is sent to the communications network 102. As will be explained in more detail, the device 104 can be configured to begin using the requested service and/or service level almost immediately after sending a service change request to the communications network 102. In some embodiments, the device 104 is configured to wait a designated amount of time that reflects the expected delay between sending the request to the communications network 102, and when the requested service and/or service level is provisioned. In some embodiments, there is almost no delay, so the device 104 can be configured to begin operating in accordance with the requested service and/or service level immediately upon sending the service change request. The device monitoring applications and the service change applications will be described in more detail below with reference to FIGS. 4 and 5.

The applications 206 also can include a user interface (UI) application 208. The UI application 208 can interface with a client 210 (e.g., an operating system) to facilitate user interaction with device functionality and data, for example, answering/initiating calls, accepting/outputting navigation data, entering/deleting data, configuring settings, address book manipulation, multimode interaction, and the like. The applications 206 also can include other applications 212 such as, for example, firmware, navigation software, visual voicemail software, add-ons, plug-ins, voice processing, voice recording, messaging, e-mail processing, video processing, image processing, archival applications, music playback, combinations thereof, and the like, as well as subsystems and/or components. The applications 206 can be stored in the memory 204 and/or in a firmware 214 as executable instructions, and can be executed by the processor 202. The firmware 214 also can store code for execution during initialization of the device 104.

An input/output (I/O) interface 216 can be provided for input/output of data and/or signals. The I/O interface 216 can be a hardwire connection, such as, for example, a USB port, a mini-USB port, an audio jack, a PS2 port, an IEEE 1394 port, a serial port, a parallel port, an Ethernet (RJ48) port, a telephone (RJ11) port, and the like, and can accept other I/O devices such as, for example, keyboards, keypads, mice, interface tethers, stylus pens, printers, thumb drives, touch screens, multi-touch screens, touch pads, trackballs, joy sticks, microphones, remote control devices, monitors, displays, liquid crystal displays (LCD's), combinations thereof, and the like. It should be appreciated that the I/O interface 216 can be used for communications between the device and a network or local device.

The device 104 can include a vibrating alert 218 for providing a vibration alert function for the device 104. The device 104 also can include one or more light emitting diodes 220 (LED's) for providing device status information, visual alerts, warnings, and the like.

A communications component 222 can interface with the processor 202 to facilitate wired/wireless communications with external systems including, for example, a communications network 102, one or more IPCRF's 128, location systems, VoIP networks, local area networks (LAN's), wide area networks (WAN's), metropolitan area networks (MAN's), personal area networks (PAN's), and other networks, which can be implemented using WIFI®, WIMAX™, combinations and/or improvements thereof, and the like. The communications component 222 can be used instead of, or in addition to, the I/O interface 216. The communications component 222 also can include a multimode communications subsystem for providing cellular communications via different cellular technologies.

For example, a first cellular transceiver 224 can operate in one mode, for example, GSM, and an Nth transceiver 226 can operate in a different mode, for example UMTS. Although only two transceivers 224, 226 are illustrated, it should be appreciated that more than two transceivers can be included in the device 104. The communications component 222 also can include a transceiver 228 for unlicensed communications using technology such as, for example, WIFI®, WIMAX™, BLUETOOTH®, infrared, infrared data association (IRDA), near field communications (NFC), other radio frequency (RF) applications, and the like. The communications component 222 also can facilitate communications reception from terrestrial radio networks, digital satellite radio networks, Internet-based radio services networks, combinations thereof, and the like. The communications component 222 can process data from a network such as, for example, the Internet, a corporate intranet, a home broadband network, and the like, via an internet service provider (ISP), a digital subscriber line (DSL) provider, a cable provider, and/or a broadband provider.

Audio capabilities can be provided by an audio I/O component 230 that can include a speaker for the output of audio signals and a microphone to collect audio signals. The audio I/O component 230 can include more than one speaker, including, for example, an earpiece speaker, a loudspeaker, a ringer, and the like. The device 104 can include a slot interface 232 for accommodating a subscriber identity system 234 such as, for example, a SIM or universal SIM (USIM). The subscriber identity system 234 instead can be manufactured into the device 104, thereby obviating the need for a slot interface 232. In some embodiments, the subscriber identity system 234 can store certain features, account information, user information, rules, policies, models, and the like. The subscriber identity system 234 can be programmed by a manufacturer, a retailer, a customer, a network operator, and the like.

The device 104 can include an image capture and processing system 236 (image system). Photos and/or videos can be obtained via an associated image capture subsystem of the image system 236, for example, a camera. The device 104 also can include a video system 238 for capturing and recording video content. The video system 238 can provide video data to various applications 206, such as, for example, video teleconferencing applications, video compression applications, video messaging applications, video sharing applications, and the like.

A location component 240, can be included to send and/or receive signals such as, for example, GPS data, A-GPS data, WIFI, WIMAX™, cellular network triangulation data, and/or combinations thereof, and the like. The location component 240 can interface with cellular network nodes, telephone lines, satellites, location transmitters and/or beacons, wireless network transmitters and receivers, for example, WIFI® hotspots, radio transmitters, combinations thereof, and the like. The device 104 can obtain, generate, and/or receive data to identify its location, or can transmit data used by other devices to determine the device 104 location. The device 104 can include a power source 242 such as batteries and/or other power subsystems (AC or DC). The power source 242 can interface with an external power system or charging equipment via a power I/O component 244.

Figure 3:
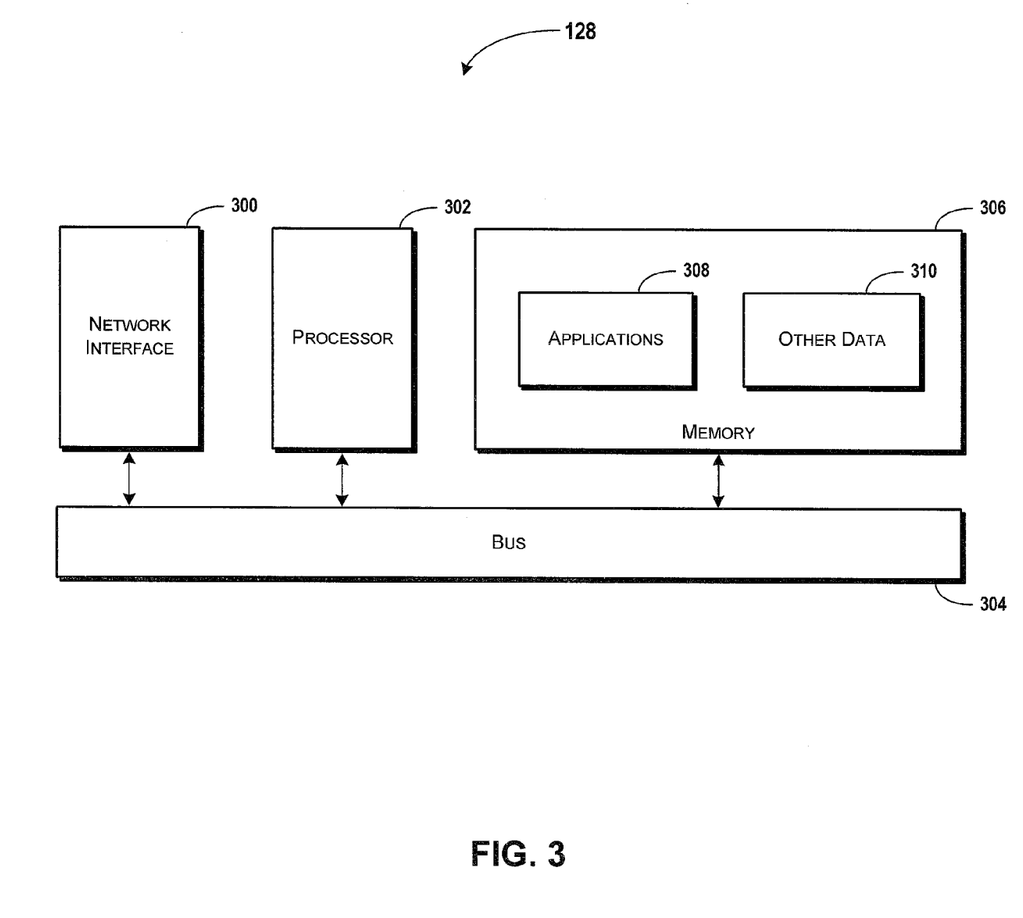
FIG. 3 schematically illustrates an instant policy control and rules function (IPCRF), according to an exemplary embodiment of the present disclosure.

FIG. 3 schematically illustrates a block diagram of an IPCRF 128, according to an exemplary embodiment of the present disclosure. The IPCRF 128 can be a combination of hardware and software, and can exist as a node upon, or in communication with, the communications network 102, as explained above with reference to FIG. 1. It should be appreciated that the functionality of the IPCRF 128 can be included as a software module executed by a hardware module associated with the communications network 102. As such, while the IPCRF 128 is described as a hardware device with associated software, it should be appreciated that the software and hardware devices can be remote from each other. The IPCRF 128 is illustrated and described as a unitary device for ease and clarity of description, and not to limit the scope of the disclosure. The IPCRF 128 can be in communication with one or more networks and/or devices such as, for example, the communications network 102, the device 104, the PCEF 122, the PCRF 124, the SPR 126, and/or other network nodes via one or more network interfaces 300.

The network interfaces 300 can be operatively linked and in communication with one or more processors 302 via one or more data/memory busses 304. The network interface 300 can be used to allow the IPCRF 128 to communicate with the device 104 and/or the other devices and networks including various additional and/or alternative components of the communications network 102, the circuit core 106, the IMS core 108, the packet core 110, the PMF 112, and/or any device connected thereto or residing thereon, as explained above. The processor 302 can be operatively linked and in communication with one or more memory devices 306 via the data/memory bus 304. The processor 302 can execute instructions to perform various functions. Execution of the instructions can cause the IPCRF 128 to perform various functions, for example, the functionality of the IPCRF 128 described in FIGS. 4-5.

The word "memory," as used herein to describe the memory 306, collectively includes all memory types associated with the IPCRF 128 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 306 is illustrated as residing proximate the processor 302, it should be understood that the memory 306 can be a remotely accessed storage system, for example, a server and/or database on the communications network 102, a remote hard disk drive, a removable storage medium, combinations thereof, and the like. Moreover, the memory 306 is intended to encompass network memory and/or other storage devices in wired or wireless communication with the IPCRF 128, which may utilize the network interface 300 to facilitate such communication. Thus, any of the data, applications, and/or software described below can be stored within the memory 306 and/or accessed via network connections to other data processing systems (not shown) that may include a local area network (LAN), a metropolitan area network (MAN), or a wide area network (WAN), for example.

Accordingly, concepts of the present disclosure may operate on the IPCRF 128, wherein the IPCRF 128 is configured as a server to one or more client data processing systems as dictated by a client/server model. The illustrated memory 306 can include one or more applications 308 and/or other data 310.

The applications 308 can include various programs, routines, subroutines, algorithms, software, tools, and the like ("instructions"), for providing differentiated service option functionality to the device 104. For example, the applications 308 can be used to recognize data received from the device 104, directly, or via a network node, as one or more service change requests. The applications 308 can also include instructions for evaluating the service change requests and/or sending the service change requests to one or more elements of the communications network 102 and/or the PMF 112. These and other functions of the IPCRF 128 will be described in more detail below with reference to FIGS. 4-5.

The applications 308 also can include instructions used to operate the IPCRF 128 and/or devices connected to the IPCRF 128, if any. The instructions can include, for example, operating systems, firmware, drivers for peripherals, and the like. The applications 308 also can include, for example, authentication software, billing applications, charging applications, monitoring applications, usage tracking applications, and the like.

The other data 310 can include, for example, billing information, roaming partner lists, charging applications, account data, user device data, software, programs, algorithms, hardware data, network utilization data, and the like. The other data 310 also can include account/device data that relates to a user's account and/or to one or more devices 104. The account/device data can include, but is not limited to, the user's subscription plan, subscription features, user preferences, and/or the capabilities of the user's device 104. It should be appreciated that the account/device data can be stored at the SPR 126, the SFA 130, or another user account data storage device that is remote from the IPCRF 128.

As such, the IPCRF 128 can be in communication with one or more charging platforms, SPR's 126, subscriber databases, and/or other network nodes, to send and/or receive the account/device data relating to a user's subscription plan, usage, and charging and/or billing information. As mentioned above, in some embodiments, the IPCRF 128 accesses an SFA 130 of an SPR 126 to determine what services are available for a user.

The IPCRF 128 can analyze the account/device data to determine what features and services the user's device 104 supports by examining data relating to the device 104, for example, one or more of the IMSI or the IMEI, the serial number, a carrier, a software version(s), firmware information, one or more carrier-specific applications, combinations thereof, and the like. Additionally, the IPCRF 128 can analyze the account/device data to determine what features and services the user is entitled to request and/or use. As such, the IPCRF 128 can determine, from examining the account/device data, if the device is entitled to and/or supports instant service change requests, as will be explained in more detail below with reference to FIGS. 4 and 5.

Furthermore, the account device data can indicate if the device 104 supports WIFI®, 3G, 2G, EDGE, GPS, A-GPS, short message service (SMS) messaging, email messaging, data transfer services, network triangulation, BLUETOOTH®, NFC, audible navigation instructions, web formats, audio formats, video formats, data transfer of audio files and video files, and the like. Additionally, the account/device data can indicate whether services for the device 104 are charged/billed on a pre-paid and/or post-paid basis, or if features are available on the device 104. These capability indications can be used to grant or deny service change requests based upon a determination of whether or not the requested service can be used by the device. This determination can occur as part of a fraud protection mechanism, though such mechanisms will not be described in detail herein.

The account/device data can pass-through the IPCRF 128, or can be stored, at least temporarily, by the IPCRF 128. Additionally, billing, privacy, safety, and/or other concerns can be used to tailor functionality of the IPCRF 128 through the account/device data. For example, a user can disable the functionality of the IPCRF 128 and store a preference indicating disablement of the IPCRF 128 as an account setting stored in the account/device data. Additionally, the IPCRF 128 can use billing information to adjust functionality of the IPCRF 128. For example, a notification can be sent from a billing platform to the IPCRF 128 and the IPCRF 128 can disable and/or enable functionality, and the like. Additionally, or alternatively, an indication can be stored in a user's profile at the SPR 126 and/or the SFA 130 and can be retrieved by the IPCRF 128. A user can be given the ability to override deactivation of some, none, or all desired features and/or functionality of the IPCRF 128.

The other data 310 also can include a charging module (not illustrated) that can be used to track, collect, and/or report activities of the IPCRF 128 to a charging and/or billing system at the IPCRF 128, or elsewhere on the communications network 102 for charging and/or billing purposes. The charging module can track, for example, how much data is sent and received by the IPCRF 128, and can report this information to a charging and/or billing system of the communications network 102, for example. Charging and/or billing can be prepaid or post-paid. The functionality of the IPCRF 128 can be charged on any desired basis, including, but not limited to, a per-use basis, as a flat fee, as part of service package, or the like.

Although not illustrated in FIG. 3, the applications 308 can also include verification modules. The verification modules can review data submitted for requesting service changes, and the like. The verification modules can perform various analyses on the service change requests to determine, for example, if the requested service is available on the network or at the device 104, if the requested quality of service (QoS) commitments are manageable, that the infrastructure exists for completing the requested communications, and the like. The applications 308 can monitor network traffic and/or obtain data collected by network monitors, and store the data for use by the IPCRF 128 when evaluating service change requests, if desired. These and other functions will be described in more detail below.

Figure 4:
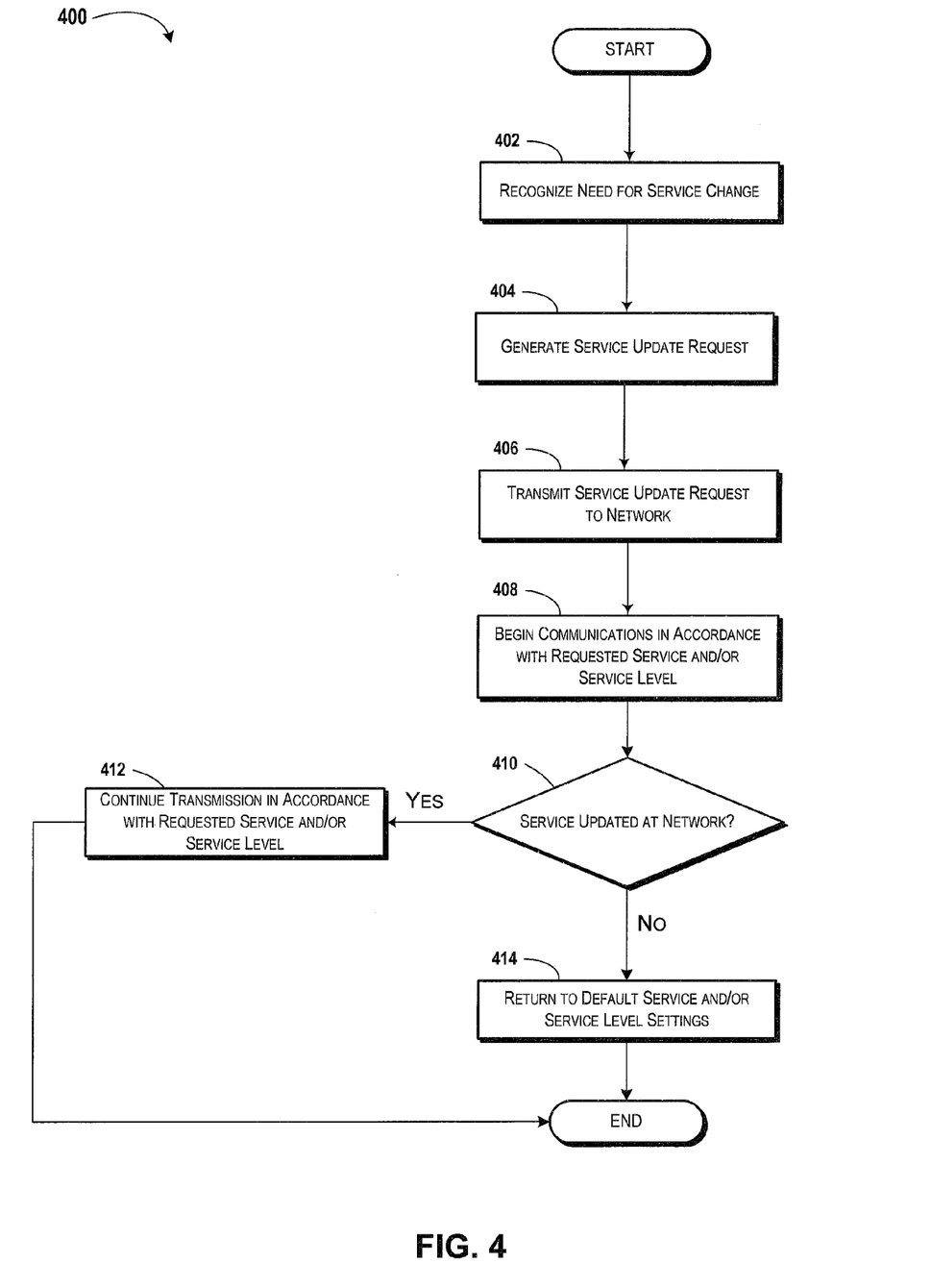
FIG. 4 schematically illustrates a method for generating and transmitting a service change request to communications networks, according to an exemplary embodiment of the present disclosure.

FIG. 4 schematically illustrates a method 400 for sending a connection request to a communications network 102, according to an exemplary embodiment of the present disclosure. It should be understood that the steps of the method 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously, without departing from the scope of the appended claims. It should also be understood that the illustrated method 400 can be ended at any time. Some or all steps of this process, and/or substantially equivalent steps, can be performed by execution of computer-readable instructions included on a computer readable medium. The term "computer-readable media" and variants thereof, as used in the description and claims, can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the computer-readable instructions.

As the illustrated method 400 begins, the device 104 can be engaged in a communication over the communications network 102. The device 104 can be configured to recognize when a service change, for example, a QoS change, is needed to provide a requested service and/or resource. In some embodiments, the device 104 is configured with an application that monitors services and/or applications running at the device 104, as well as network traffic flowing to and from the device 104. The device monitoring application can recognize the initiation of an application or service that requires high bandwidth, initiation of a new network connection, and/or applications and services that are delay-sensitive. Similarly, the device monitoring application can recognize that data packets are being dropped during transfer, indicating that the device 104 is not being providing adequate network resources. The device monitoring application can notify a service change application that a request should be sent to the communications network 102. In some embodiments, the device monitoring application is part of the service change application At some time, as illustrated at block 402, the device 104 can be configured to recognize that a service change is needed to provide a requested communication. As explained above, the device 104 can recognize that data transfer is being delayed, that a requested service will use more bandwidth than is currently available, that a data or voice channel needs to be accessed, combinations thereof, and/or the like.

As illustrated at block 404, the device 104 can generate a request for a service change, for example, a QoS update. The service change application can generate a service change request that indicates the service and/or service level that the device 104 wishes to initiate. The service change request can specify a QoS level, a data flow rate, a new desired connection, a requested service and/or application, combinations thereof, and the like. The service change request can include routing information to indicate to the communications network 102 the device address and/or identity, authentication data, account information, and/or the like, to verify entitlement and/or to ensure proper delivery of the network resource. As illustrated at block 406, the device 104 can transmit the generated service change request to the communications network 102. The request can be transmitted in an appropriate protocol and to an appropriate device, as determined by a network operator. The transmitted service change request can be received at the communications network 102 and can be received by or routed to the correct node or device, as will be described in more detail below with reference to FIG. 5.

As illustrated at block 408, the device 104 can begin operating in accordance with the requested service change. In some embodiments, the device 104 begins operating in accordance with the requested service change almost immediately. For example, if a user wishes to open a video stream, the device 104 can submit a service change request to the communications network 102, indicating that the device 104 is in need of a higher QoS, and the device 104 can begin operating in accordance with the requested QoS. Similarly, a user may request a large document, interactive gaming, streaming video, a VoIP session, or handling of an emergency call, all of which may call for a higher QoS level than the QoS level the device 104 is currently granted. Instead of negotiating with the communications network 102 to obtain the higher QoS, the device 104 can pass a notification to the communications network 102 and begin operating in accordance with the new QoS.

The device 104 can be configured to recognize whether or not the network has adjusted the communications and/or other services in accordance with the requested service change by, for example, monitoring traffic to and from the device 104, receiving a confirmation message from the network, by interfacing with a traffic monitoring node, or using other methods. As illustrated at block 410, the device 104 can determine if the network has made the requested change by recognizing dropped packets, transmission delays, failure of a service to initialize, receipt of a service denial message from a network node, failure to receive a notification that the requested service change has been implemented, combinations thereof, and the like. If the device 104 recognizes that the requested service change has been granted, flow can proceed to block 412, and the communications can continue at the updated service level. The method 400 can end.

If, at block 410, the device 104 determines that the requested service change has not been implemented, flow can proceed to block 414, whereat the device 104 can return to transmission at a different service level, for example, a previous level, a default level, and/or another level. Although not illustrated, the device 104 can attempt retransmission of the service change request, if desired, at any time. The retransmission can occur at a designated time interval, when the device 104 attempts to start a new service or application, combinations thereof, and the like. The method 400 can end.

Figure 5:
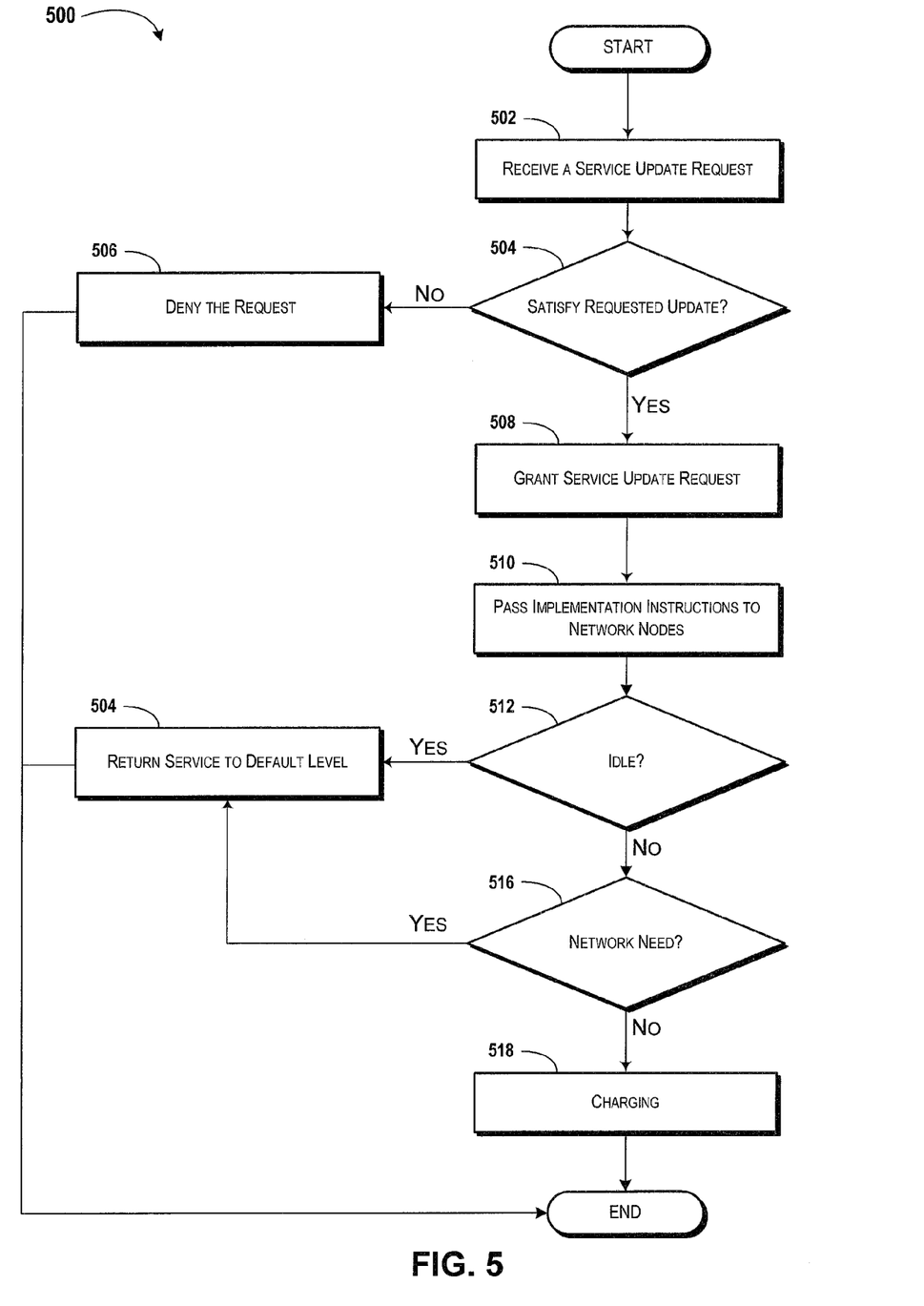
FIG. 5 schematically illustrates a method for providing differentiated user service options on communications networks, according to an exemplary embodiment of the present disclosure.

FIG. 5 schematically illustrates a method 500 for implementing a service change request received by a communications network 102 to provide differentiated service options to a user of the communications network 102, according to an exemplary embodiment of the present disclosure. It should be understood that the steps of the method 500 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. Some or all steps of this process, and/or substantially equivalent steps, can be performed by execution of computer-readable instructions included on a computer readable medium. The term "computer-readable media" and variants thereof, as used in the description and claims, can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the computer-readable instructions.

As the illustrated method 500 begins, the device 104 can be engaged in a communication over the communications network 102. At some time, the device 104 generates a request for a service update and the device 104 transmits the service change request to the communications network 102, as explained above with reference to FIG. 4. Flow proceeds to block 502, wherein the service change request is received at the communications network 102. The communications network 102 can route the service change request to a node responsible for evaluating service change requests. In some embodiments, the service change request is routed to the IPCRF 128.

At block 504, the IPCRF 128 can determine if the request should be satisfied. The IPCRF 128 can access the SPR 126, the SFA 130, or another node responsible for user profiles to see if the user has paid for, or is otherwise entitled to request service changes. It should be appreciated that the PCRF 124 can determine if the device 104 is entitled to request service updates during an initial profile lookup. For example, the PCRF 124 can retrieve a user's profile from an SPR 126 or SFA 130 during initial setup of a communication session. The PCRF 124 can also the SFA 130 to see if the user is entitled to request service changes, and the PCRF 124, or another network node, can instruct the IPCRF 128 that the device 104 is entitled to request service changes. The IPCRF 128 can react to this notification by preparing to receive and accommodate service change requests before a service change request is received. Alternatively, the IPCRF 128 can access a profile for the device 104 when a request is received to determine if the user is entitled to change his service features.

If the device 104 is entitled to change the service features, the IPCRF 128 can determine if the network can accommodate the requested change. For example, the IPCRF 128 can access a network monitor to determine if the network is able to provide the requested service based upon current utilizations, current infrastructure, and/or combinations thereof, and the like. If the IPCRF 128 determines that the user is not entitled to change his service level, or that the network cannot accommodate the requested change, the IPCRF 128 can determine that the service change request is not to be satisfied.

If the IPCRF 128 determines that the service change request is not to be satisfied, the method 500 can proceed to block 506, whereat the request can be denied, the request can be disregarded, and the method 500 can end. In some embodiments, a denied request will not be recorded and no chargeable event will be recognized by the communications network 102. In some embodiments, each service change request is a chargeable event, regardless of whether or not the communications network 102 can accommodate the request. Similarly, the communications network 102 can pass a notification to the device 104 that the requested service change cannot be accommodated. In some embodiments, however, the communications network 102 does not notify the device 104 of unsuccessful service change requests.

If the IPCRF 128 determines that the request can be satisfied, flow can proceed to block 508, whereat the IPCRF 128 can grant the request. At block 510, the IPCRF 128 can pass information to one or more network nodes to implement, report, and/or charge for the service change. In some embodiments, the IPCRF 128 can pass information to the SPR 126, and the SPR 126 can change the user's service to reflect the service change request. As such, the SPR 126 can store the data to set parameters for the user's default service permissions.

Furthermore, the IPCRF 128 can pass information to an enforcement point to update the enforcement point with the new information, thereby allowing the updated service to be provisioned. For example, if a service change request relates to a QoS, the IPCRF 128 can pass information relating to a granted service change request to an SGSN 118 and/or a GGSN 120 to adjust the flow of packets through the respective nodes. The IPCRF 128, or another node working with the IPCRF 128 can instruct other nodes to provide the requested services and/or service levels. Similarly, the IPCRF 128 can pass information to a charging module, for example, by generating a charging record for the new service, and transmitting the charging record to the charging module.

As illustrated at block 512, the IPCRF 128 can monitor the communication, or receive data relating to the communication, to determine if the updated service is being utilized by the device 104. For example, the IPCRF 128 can determine if communications are idle, i.e., if the network resources are being utilized appropriately. In some embodiments, the IPCRF 128 determines, or gathers data that indicates, whether the communications have been idle for a designated time period. In some embodiments, the IPCRF 128 determines, or gathers data that indicates, whether the updated service, or a resource granted to allow the device 104 to operate in accordance with the service change request, is utilized at a designated level, e.g., 10%, 20%, 50%, 85%, 95%, 100%, and the like. If the IPCRF 128 determines, or gathers data that indicates, that the service or resource is idle, or not operating at the designated level, for the time period, the method 500 can proceed to block 514, whereat the IPCRF 128 can return the service or service level to the default service or service level. The IPCRF 128 can communicate the change to one or more enforcement points, e.g., a SGSN 118 and/or a GGSN 120, as well as to a profile database, e.g., the SPR 126 and/or the SFA 130, to lower the current service, and to return the stored service level to the default level.

As illustrated at block 516, the IPCRF 128 can monitor, or receive data relating to, network traffic. If the IPCRF 128 recognizes that the network has an emergent need for the resources previously granted to the device 104. If such a need is recognized, the IPCRF 128 can stop a service and/or return a service level to the default level, as illustrated at block 514. Blocks 512-516 can be repeated to determine if the service and/or a service level should be adjusted. The blocks can be repeated at desired intervals, upon occurrence of trigger events, etc.

As illustrated at block 518, the IPCRF 128 can generate a charging item for submission to a charging system. It will be appreciated that the charging item can be generated at any time, as explained above with respect to block 510. Additionally, the IPCRF 128 can update a user's bill by creating a new charging item if a service and/or service level is adjusted for being idle, for another service, to meet a network need, or for other considerations, as explained in blocks 512-516, or for other considerations. Although not illustrated in FIG. 5, it should be understood that charging items can be created when service changes are requested, whether or not the changes are implemented. As mentioned briefly above, the charging item can be based upon volume, time, transfer rates, and/or other considerations. Additionally, or alternatively, the charging items can indicate that the requested service is included in the user's service subscription. The charging item can be transmitted to a charging module. The method 500 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system for providing communications services to a device operating on a communications network, the system comprising:

a computer processor; and a memory storing computer-readable instructions executable by the processor to cause the processor to perform a method comprising:

recognizing received data as an instant service change request from the device operating at a first service level on the communications network, wherein the instant service change request is initiated by the device as a result of the device monitoring execution of at least one of a service and an application by the device and determining that, for proper execution of the at least one of the service and the application, the device needs to operate at a second service level instead of the first service level;

passing a service instruction to a network node instructing the network node to allow the device to operate at the second service level, the second service level corresponding to a service level requested in the instant service change request;

retrieving and analyzing data indicating a status of a resource provided to the device to allow the device to operate at the second service level; and determining if the device is using the resource provided to the device, wherein the device waits a designated amount of time before using the resource once the instant service change request is sent by the device.

2. The system of claim 1, further comprising computer-readable instructions stored in the memory and executable by the processor to cause the processor to:

determine if the user is entitled to request instant service changes by retrieving and analyzing a service function account setting associated with the user, wherein the service function account setting is stored at a subscriber profile repository as a subscriber profile setting; and grant the instant service change request if the user is entitled to request instant service changes.

3. The system of claim 1, further comprising computer-readable instructions stored in the memory and executable by the processor to cause the processor to:

determine if the user is entitled to request instant service changes by retrieving and analyzing data that indicates if network resources are available for allowing the device to operate at the second service level; and grant the instant service change request if the user is entitled to request instant service changes.

4. The system of claim 3, further comprising computer-readable instructions stored in the memory and executable by the processor to cause the processor to retrieve and analyze data, generated by a network monitoring device, that indicates if network resources are available to determine if network resources are available for allowing the device to operate at the second service level.

5. The system of claim 1, wherein:

the service instruction is a first service instruction; and the system further comprises computer-readable instructions stored in the memory and executable by the processor to cause the processor to pass a second service instruction to the network node instructing the network node to allow the device to operate at the first service level if the processor determines that the resource provided to the device is not being utilized by the device.

6. The system of claim 5, further comprising computer-readable instructions stored in the memory and executable by the processor to cause the processor to determine that the resource provided to the device is not being utilized at a designated level over a designated time period.

7. The system of claim 1, further comprising computer-readable instructions stored in the memory and executable by the processor to cause the processor to:

retrieve and analyze data indicating a status of the communications network; and determine based on the status of the communications network if the communications network needs the network resource provided to the device to allow the device to operate at the second service level.

8. The system of claim 7, further comprising computer-readable instructions stored in the memory and executable by the processor to cause the processor to pass the service instructions to the network node instructing the network node to allow the device to operate at the first service level if the processor determines that the communications network needs the network resource provided to the device.

9. The system of claim 8, further comprising computer-readable instructions stored in the memory and executable by the processor to cause the processor to determine that the communications network needs the network resource provided to the device by determining that an emergency communication needs the network resource.

10. The system of claim 8, further comprising computer-readable instructions stored in the memory and executable by the processor to cause the processor to:

generate a charging record indicating the instant service change request and that the communications network provided the resource to allow the device to operate at the second service level; and transmit the charging record to a charging module of the communications network.

11. A device for operation on a communications network, the device comprising:

a memory in communication with a processor and a network interface, wherein the memory stores computer-readable instructions, executable by the processor to cause the processor to perform a method comprising:

monitoring execution of at least one of a service and an application by the device;

recognizing that, for proper execution of the at least one of the service and the application, the device needs to operate at a second service level instead of a first service level at which the device is currently operating;

generating an instant service change request that requests that the communications network allow the device to operate at the second service level;

transmitting to a network node, via the network interface, the instant service change request;

beginning communications in accordance with the second service level after waiting a designated amount of time once the instant service change request is transmitted; and determining if the communications network is operating in accordance with the requested second service level.

12. The device of claim 11, further comprising computer-readable instructions stored in the memory and executable by the processor to cause the processor to recognize received data as an indication from a node of the communications network that the device may not operate at the second service level and to determine if the device is operating at the second service level.

13. The device claim 11, wherein the device continues transmission at the second service level, if the device determines that the communications network is operating in accordance with the second service level, and the device begins transmission at the first service level, if the device determines that the communications network is not operating in accordance with the second service level.

14. The device of claim 11, further comprising computer-readable instructions stored in the memory and executable by the processor to cause the processor to determine if delivery of a data packet is delayed.

15. The device of claim 12, further comprising computer-readable instructions stored in the memory and executable by the processor to cause the processor to retransmit the instant service change request if the processor determines that the device is not operating at the second service level.

16. A method for providing service to a device operating on a communications network, the method comprising:

recognizing data received at a computer processor as an instant service change request sent by the device operating at a first service level on the communications network, wherein the instant service change request is initiated by the device as a result of the device monitoring execution of at least one of a service and an application by the device and determining that, for proper execution of the at least one of the service and the application, the device needs to operate at a second service level instead of the first service level;

passing a service instruction to a network node instructing the network node to allow the device to operate at the second service level, the second service level corresponding to a service level requested in the instant service change request; and retrieving and analyzing, at the computer processor, data indicating a status of a resource provided to the device to allow the device to operate at the second service level to determine if the device is using the network resource provided to the device, wherein the device waits a designated amount of time before using the resource once the instant service change request is sent by the device.

17. The method of claim 16, further comprising:

determining, at the computer processor, if the device is entitled to request instant service changes, wherein determining if the device is entitled to request instant service changes includes:

obtaining, at the computer processor, a first data stored at a subscriber profile repository, the first data indicating the service level at which the device is entitled to operate;

obtaining, at the computer processor, a second data stored at a service function account, the second data indicating if the device is entitled to request instant service changes; and obtaining, at the computer processor, network data that indicates if the communications network can allow the device to operate at the second service level; and granting the instant service change request, if the computer processor determines that a user associated with the device is entitled to request instant service changes.

18. The method of claim 17, further comprising determining at the computer processor, after passing the service instruction to the network node instructing the network node to allow the device to operate at the second service level, if the communications network should continue to allow the device to operate at the second service level.

19. The method of claim 16, wherein:

the service instruction is a first service instruction; and the method further comprises passing a second service instruction to the network node instructing the network node to allow the device to operate at the first service level if the computer processor determines that the network resource provided to the device is not being utilized by the device.

20. The method of claim 19, wherein the computer processor determines that the network resource provided to the device is not being utilized by determining that the resource is not being utilized at a designated level over a designated time period.

21. The system of claim 1, wherein the designated amount of time corresponds to a delay between sending the instant service change request and providing the resource to the device to allow the device to operate at the second service level.

* * * * *